US008108202B2

(12) United States Patent
Kwon et al.

(10) Patent No.: US 8,108,202 B2
(45) Date of Patent: Jan. 31, 2012

(54) MACHINE TRANSLATION METHOD FOR PDF FILE

(75) Inventors: Oh Woog Kwon, Daejeon (KR); Sung Kwon Choi, Daejeon (KR); Ki Young Lee, Daejeon (KR); Yoon-Hyung Roh, Daejeon (KR); Young Kil Kim, Daejeon (KR); Chang Hyun Kim, Daejeon (KR); Young-Ae Seo, Daejeon (KR); Seong Il Yang, Daejeon (KR); Young-Sook Hwang, Daejeon (KR); Chang-Hao Yin, Daejeon (KR); Eun jin Park, Busan (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 892 days.

(21) Appl. No.: 12/155,131

(22) Filed: May 29, 2008

(65) Prior Publication Data

US 2009/0030671 A1    Jan. 29, 2009

(30) Foreign Application Priority Data

Jul. 27, 2007  (KR) ........................ 10-2007-0075581

(51) Int. Cl.
*G06F 17/28* (2006.01)
(52) U.S. Cl. ................................ 704/2; 704/9; 704/277
(58) Field of Classification Search ................ 704/1–10, 704/277, 257, 251, 270; 715/221; 382/229
See application file for complete search history.

(56) References Cited

U.S. PATENT DOCUMENTS

| 5,587,902 | A | * | 12/1996 | Kugimiya | 704/2 |
| 6,516,296 | B1 | * | 2/2003 | Fuji | 704/3 |
| 7,013,309 | B2 | | 3/2006 | Chakraborty et al. | |
| 7,305,612 | B2 | * | 12/2007 | Chakraborty | 715/221 |
| 7,406,201 | B2 | * | 7/2008 | Heilper et al. | 382/229 |
| 2007/0055933 | A1 | | 3/2007 | Dejean et al. | |
| 2007/0150260 | A1 | | 6/2007 | Lee et al. | |

FOREIGN PATENT DOCUMENTS

JP    2004-102554    4/2004
(Continued)

OTHER PUBLICATIONS

Bill Hollingsworth et al., "Retrieving Hierarchical Text Structure from Typeset Scientific Article—a Prerequisite for E-Science Text Mining", University of Cambridge Computer Laboratory.

(Continued)

*Primary Examiner* — Huyen X. Vo
(74) *Attorney, Agent, or Firm* — Staas & Halsey LLP

(57) ABSTRACT

Disclosed is a machine translation method for a PDF file. A machine translation device extracts source language text and non-text from the input source language PDF file through image transformation, corrects the extracted source language text by using the source language text extracted from text information, restores a part that is contextually separated by the non-text from among the extracted source language text, generates a source language XML/HTML file by rearranging the extracted text and non-text so as to satisfy the contextual flow of the source language PDF file, separates source language text from a tag of the source language XML/HTML file, generates target language text by using translation knowledge and a transformation engine specified for the technical field corresponding to the source language PDF file, inserts the translated target language text other than source language text into XML/HTML file, and transforms the generated target language XML/HTML file into a target language PDF file to be output.

13 Claims, 10 Drawing Sheets

FOREIGN PATENT DOCUMENTS

| | | |
|---|---|---|
| JP | 2007-34430 | 2/2007 |
| KR | 1020020020409 | 3/2002 |
| KR | 10-2004-0016198 A | 2/2004 |
| KR | 10-2007-0058950 | 6/2007 |

OTHER PUBLICATIONS

Korean Office Action issued on Apr. 30, 2009 in corresponding Korean Patent Application 10-2007-0075581.

* cited by examiner

FIG.7

301 — Proceedings of the Seventh IASTED International Conference
COMPUTER GRAPHICS AND IMAGING
August 17-19, 2004, Kauai, Hawaii, USA

302 — REVERSIBLE $N$-BIT TO $N$-BIT INTEGER HAAR-LIKE TRANSFORMS

303 — Joshua G. Senecal*, Mark A. Duchaineau[†], Kenneth I. Joy[‡]

304 — *Institute for Scientific Computing Research
[†]Center for Applied Scientific Computing
Lawrence Livermore National Laboratory
{senecal1,duchaine}@llnl.gov 305 — [‡]Institute for Data Analysis and Visualization
Computer Science Department
University of California, Davis
kijoy@ucdavis.edu

306 — ABSTRACT

307 — We introduce TLHaar, an $n$-bit to $n$-bit reversible transform similar to the S-transform. TLHaar uses lookup tables that approximate the S-transform, but reorder the coefficients so they fit into $n$ bits. TLHaar is suited for lossless compression in fixed-width channels, such as digital video channels and graphics hardware frame buffers. Tests indicate that when the incoming image data has lines or hard edges TLHaar coefficients compress better than S-transform coefficients. For other types of image data TLHaar coefficients compress up to 2.5% worse than those of the S-transform, depending on the data and the compression method used.

308 — KEY WORDS

309 — Image Processing, Fixed-Width Transforms, Wavelets, Image Compression

310 — 1 Introduction

311 — Integer wavelet transforms have what is termed *dynamic range expansion*. Simply put, dynamic range expansion means that the range over which wavelet coefficients can take their values is larger than that of the input domain. This usually requires that the number of bits required to hold the wavelet coefficients is greater than the number of bits required to hold the input data (for a discussion of dynamic range expansion and its effects see [1]). A common integer wavelet transform is the S-transform [2], which is an integer version of the Haar wavelet transform[3][§]. The Haar transform is defined by:

312 — $$\hat{H} = \frac{B-A}{\sqrt{2}} \quad (1)$$

313 — $$\hat{L} = \frac{A+B}{\sqrt{2}} \quad (2)$$

314 — *L-419, PO Box 808, Livermore, CA 94551, U.S.A. Tel: 925-422-3764, Fax: 925-422-7819
[†]L-561, PO Box 808, Livermore, CA 94551, U.S.A.
[‡]One Shields Ave, Davis, CA 95616, U.S.A.
[§]Throughout this paper $\hat{H}$ and $\hat{L}$ denote coefficients produced by Haar, $H$ and $L$ denote those produced by the S-transform, and $H$ and $L$ denote those produced by our method, TLHaar.

315 — and the S-transform by:

316 — $$H = B - A \quad (3)$$

317 — $$L = \left\lfloor \frac{A+B}{2} \right\rfloor \quad (4)$$

318 — where $A$ and $B$ are two adjacent values to be transformed.

319 — In the S-transform dynamic range expansion is due to the subtraction that occurs in the transform procedure—it is necessary to store a sign bit for all nonzero high-pass coefficients. These sign bits present some problems. First, there is raw data inflation: the number of bits required to store the transformed data is greater than that required to store the original data. Second, since modern computers store data in 8-bit chunks, an actual implementation that takes (for example) 8-bit inputs must store each 9-bit coefficient in a data type 16 bits wide, thus consuming twice the memory bandwidth. If this transform is being done in a fixed-width hardware environment and 16-bit values are unavailable, some data loss will result.

320 — Referring to the Haar equations 1 and 2, if we remove the normalization by $\sqrt{2}$ we have the non-normalized Haar transform $H = B - A$ and $L = A + B$ (note that $H = \hat{H}$). We see from figure 1 that the non-normalized Haar transform expands the domain by $\sqrt{2}$ and rotates it by 45 degrees. This gives new high- and low-pass values a range twice that of the original domain, as measured along the axes. It should be obvious that if the inputs to the non-normalized Haar transform are limited to an integer domain then the range will also contain only integers. Furthermore, the number of positions occupied in the range will be equal to the number occupied in the domain, with the range being organized in a lattice.

321 — The S-transform takes advantage of the space in between entries in the range lattice, and "squashes" the non-normalized Haar range so that its low-pass values fall into the original domain. This squashing $\hat{L} \rightarrow L$ is done by right-shifting $\hat{L}$ one bit, thus eliminating the LSB. Because the LSB of $\hat{H}$ and $\hat{L}$ are identical, no information is lost during the squashing process—the LSB needed to reconstruct $\hat{L}$ can be taken from $\hat{H}$—and the transform is completely reversible. While this effectively eliminates dy-

322 — 426-060    135

MACHINE TRANSLATION METHOD FOR PDF FILE

CROSS-REFERENCE TO RELATED APPLICATION

This application claims priority to and the benefit of Korean Patent Application No. 10-2007-0075581 filed in the Korean Intellectual Property Office on Jul. 27, 2007, the entire contents of which are incorporated herein by reference.

BACKGROUND OF THE INVENTION (a) Field of the Invention

The present invention relates to a machine translation method. More particularly, the present invention relates to a method for automatically translating a portable document format (PDF) file.

(b) Description of the Related Art

When a PDF file is automatically translation and the PDF file is transformed into text for translation in the conventional case, text is frequently divided from non-text such as figures, tables, and footnote. As a result, the translation unit to be translated is not preserved when attempting to translate the PDF file and a text error occurs in the source, and hence translation quality of the machine translation device is worsened.

Also, when a source language file using vocabulary and syntactic structures specified for a predetermined technical field is translated, the translation is performed by using translation knowledge and transformation patterns corresponding to a general domain, and hence the translation quality is degraded because of an error of selecting target language vocabulary. Particularly, scientific papers have rapidly increased in various specialized fields over the entire world, and newly combined professional fields have also been generated according to interdisciplinary fusion, but there is no professional machine translation devices for engineering transactions for solving the lack of understanding on the engineering transactions that occurs because of language barriers between different languages such as between Korean and English. Therefore, the conventional machine translation devices fail to reflect the proper linguistic characteristics of the scientific papers during translation to thus cause low translation rate and translation quality.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a machine translation method for reducing a translation error caused by a contextual division phenomenon of text during translating a source language PDF file, and reflecting the proper linguistic characteristics of the technical field corresponding to the source language PDF file.

In one aspect of the present invention, a machine translating method for a source language PDF file in a machine translation device includes extracting source language text from the source language PDF file, restoring the source language text by combining a contextually divided body paragraph in the source language text, and translating the restored source language text into target language text.

In another aspect of the present invention, a method for mechanically translating a source language PDF file in a machine translation device includes: transforming the source language PDF file into an image by using print information of the source language PDF file; extracting the first source language text from the resulting image; extracting the second source language text from text information of the source language PDF file when the source language PDF file is an electronic document text file; comparing the first source language text and the second source language text and correcting the first source language text when the source language PDF file is an electronic document text file; and translating the first source language text into target language text.

In another aspect of the present invention, a method for mechanically translating a source language PDF file in a machine translation device includes: extracting source language text and non-text from the source language PDF file; restoring the source language text by combining a contextually separated paragraph from among the source language text; generating a source language markup language file by rearranging the restored source language text and the non-text based on the contextual flow of the source language PDF file; and generating a target language markup language file by translating the restored source language text into target language text.

According to the exemplary embodiments of the present invention, when translation is performed by using translation knowledge and transformation patterns specified for satisfying the technical domain of the source language PDF file to be translated, more accurate translation is allowable since ambiguity of morpheme parts of speech, ambiguity of syntactic rules, ambiguity of selecting target language words, and ambiguity of sentence pattern/transformation patterns are not occured.

Also, errors that may be generated during the text extraction process can be reduced since text extraction through image transformation and text extraction through text information are performed, and text correction is then performed during the text extraction process for translation.

Further, in order to prevent the difficulty of translation caused by division of sentences by figures, tables, numerical formulas, footnotes, prefaces, and postfaces when extracting text and making the sentence for the purpose of translation, a complete sentence is generated by combining the divided paragraphs through paragraph analysis, thereby preventing failure of translation because of incomplete sentences.

BRIEF DESCRIPTION OF THE DRAWINGS

FIG. 7 is a case for classifying text paragraphs from the first page of a source language PDF file that is a scientific paper according to an exemplary embodiment of the present invention.

DETAILED DESCRIPTION OF THE EMBODIMENTS

Figure 1:
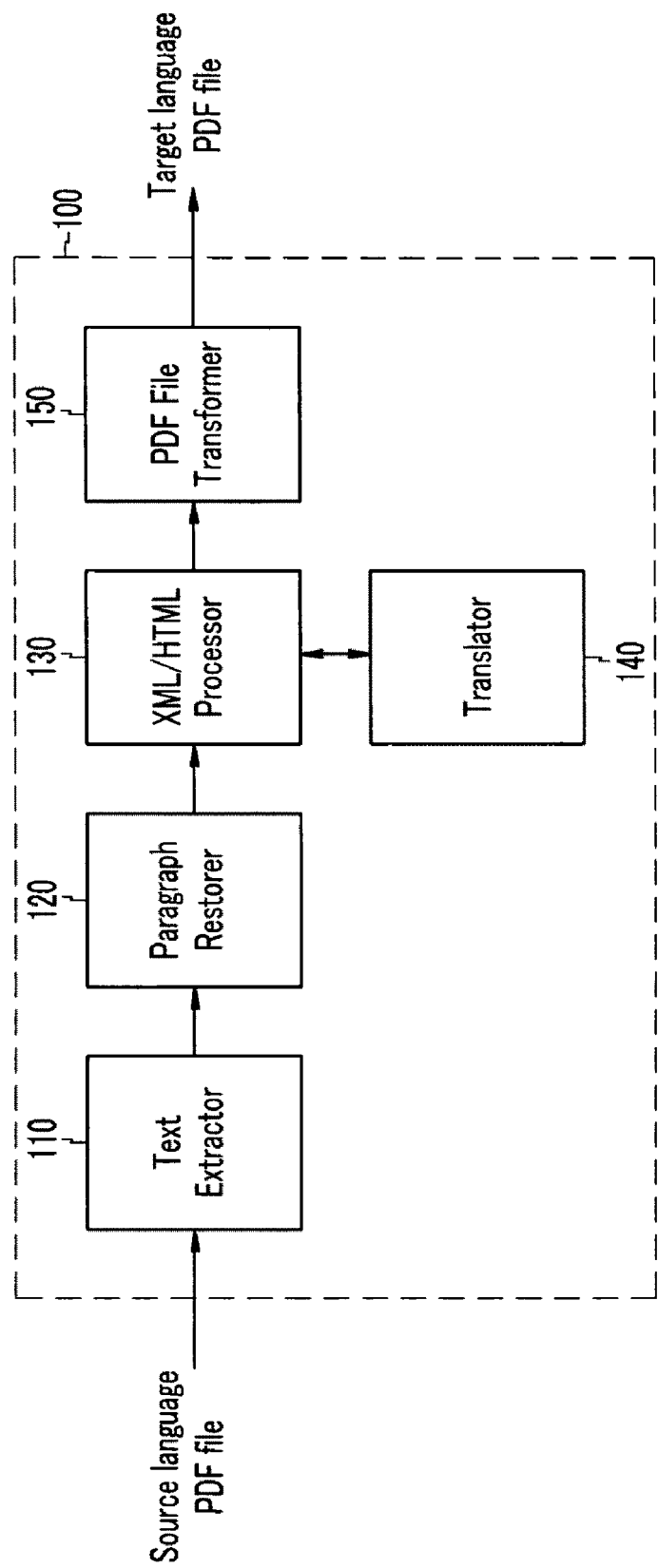
FIG. 1 is a configuration diagram for a machine translation device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" and variations such as "comprises" will be understood to imply the inclusion of stated elements but not the exclusion of any other elements.

Also, the terms of a unit, a device, and a module in the present specification represent a unit for processing a predetermined function or operation, which can be realized by hardware, software, or a combination of hardware and software.

Referring to FIG. 1 to FIG. 4, a machine translation device according to an exemplary embodiment of the present invention will now be described.

In the exemplary embodiment of the present invention, the source language portable document format (PDF) file to be translated will be exemplified as a technical transaction file, and the embodiment of the present invention is applicable to other types of PDF files.

FIG. 1 is a configuration diagram for a machine translation device 100 according to an exemplary embodiment of the present invention.

Referring to FIG. 1, the machine translation device 100 includes a text extractor 110, a paragraph restorer 120, an XML/HTML processor 130, a translator 140, and a PDF file transformer 150.

When receiving a source language PDF file, the text extractor 110 extracts source language text and non-text of the corresponding source language PDF file for each page. Here, the non-text represents a figure, a numerical formula, and a table. The text extractor 110 extracts text-related information including source language text and non-text position information, and font information including character font and font size corresponding to the source language text. Here, the position information represents information that includes orders of source language text and absolute positions in the page.

Also, the text extractor 110 classifies text paragraphs included in the page based on the text-related information for each page, and structures position information of respective text paragraphs and text paragraph information including the font and size, and then outputs structured information.

The paragraph restorer 120 receives classified text paragraphs and text paragraph information from the text extractor 110, combines and restores text paragraphs that are contextually one but are physically divided so as to generate accurate paragraphs, and combines the text paragraphs according to the contextual flow of the source language PDF file to generate a source language XML/HTML (extensible Markup Language/HyperText Markup Language) file. The text paragraphs that are extracted for translation are rearranged and transformed into the source language XML/HTML file since source language text can be translated while maintaining the document format of the source language PDF file in the case of transforming the source language PDF file into the source language XML/HTML file and then translating the same.

The XML/HTML processor 130 divides the source language text to be translated from the tag of the source language XML/HTML file generated by the paragraph restorer 120 and outputs the source language text to the translator 140, and receives target language text that is the translated result of the source language text from the translator 140. Also, the XML/HTML processor 130 having received the target language text inserts the target language text into the tag of the XML/HTML file other than source language text to generate a target language XML/HTML file.

The translator 140 translates the input source language text into target language text by using translation knowledge and an engine specified for the technical domain characteristic of the source language PDF file. For example, when the input source language PDF file has a technical transaction format, the translator 140 translates the corresponding file by using technical terms and sentence pattern/transformation pattern used for the technical transaction domain including the corresponding source language PDF file.

The PDF file transformer 150 receives the target language XML/HTML file from the XML/HTML processor 130, transforms it into a target language PDF file, and then outputs the transformed file.

Figure 2:
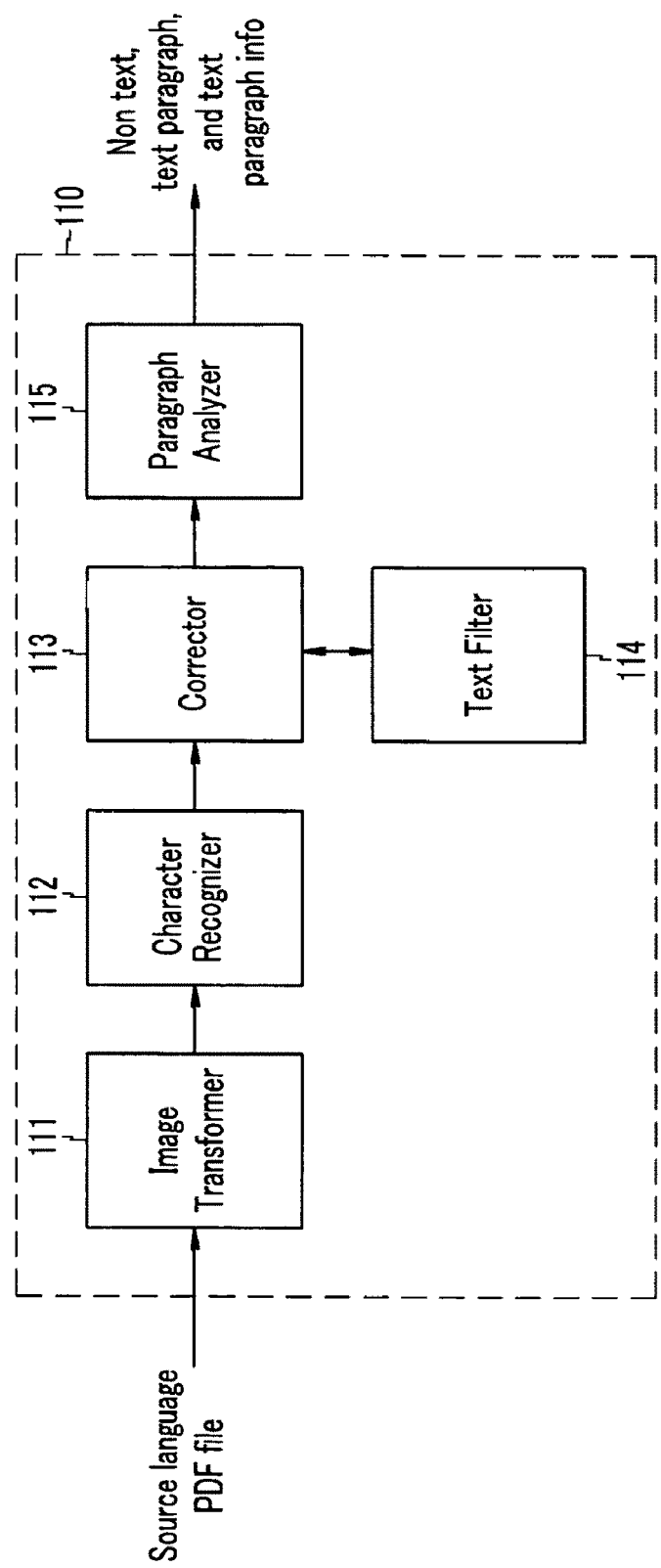
FIG. 2 is a configuration diagram for a text extractor according to an exemplary embodiment of the present invention.

FIG. 2 is a configuration diagram for a text extractor 110 according to an exemplary embodiment of the present invention.

Referring to FIG. 2, the text extractor 110 includes an image transformer 111, a character recognizer 112, a text filter 114, a corrector 113, and a paragraph analyzer 115.

The image transformer 111 transforms the source language PDF file into an image for each page by using print information of the PDF code included in the source language PDF file.

The character recognizer 112 recognizes and extracts the source language text, figures, tables, and numerical formulas for each page transformed by the image transformer 111, and extracts position information of the source language text and non-text, and text-related information including the character font and size corresponding to the source language text.

The text filter 114 determines whether the input source language PDF file is a text PDF file having text information, and extracts source language text and corresponding position information for each page of the corresponding file when the input source language PDF file is a text PDF file. Here, the PDF file is classified as two types depending on whether the PDF code includes character information on the text, and it is called a text PDF file when the PDF code includes character information on the text and it is called an image PDF file in another case.

When the input source language PDF file is a text PDF file, the corrector 113 compares the source language text recognized by the character recognizer 112 and the source language text extracted by the text filter 114 according to position information of the source language text included in the text-related information, and outputs source language text in which a character recognition error or a character repetition error is corrected.

The paragraph analyzer 115 classifies text paragraphs included in the pages for respective pages based on the position information of the source language text and non-text, and the character font and size corresponding to the source language text, structures text paragraph classification information including position information of the respective text paragraphs, font, and size, and then outputs the structured results.

Figure 3:
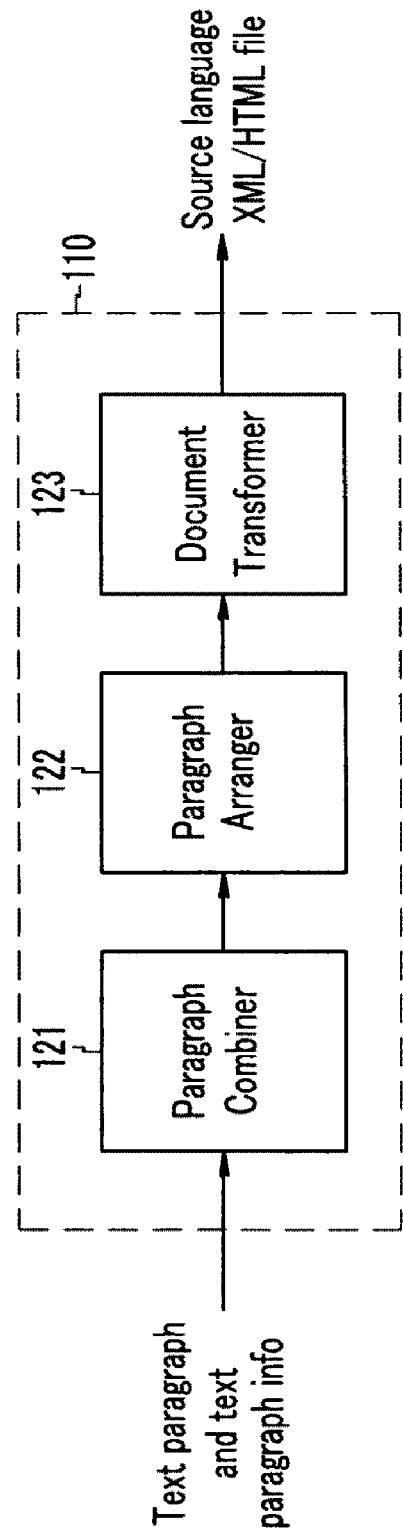
FIG. 3 is a configuration diagram for a paragraph restorer according to an exemplary embodiment of the present invention.

FIG. 3 is a configuration diagram for a paragraph restorer 120 according to an exemplary embodiment of the present invention.

Referring to FIG. 3, the paragraph restorer 120 includes a paragraph combiner 121, a paragraph arranger 122, and a document transformer 123.

The paragraph combiner 121 combines the text paragraphs that are contextually a single text paragraph and are physically divided by the figures, tables, numerical formulas, captions, footnotes, prefaces, and postfaces into a plurality of pieces in the source language PDF file from among the source language text paragraph extracted by the text extractor 110 into a single paragraph, and then outputs the combined paragraph.

The paragraph arranger 122 rearranges the text paragraphs by using position information on the respective text paragraphs and the combined text paragraph. Here, the position information used for rearranging the combined text paragraph can be acquired from position information of the first text paragraph of the corresponding combined text paragraph.

The document transformer 123 transforms the text paragraph rearranged by the paragraph arranger 122 into a source language XML/HTML file that has the same contextual flow and a similar structure format as the source language PDF file.

Figure 4:
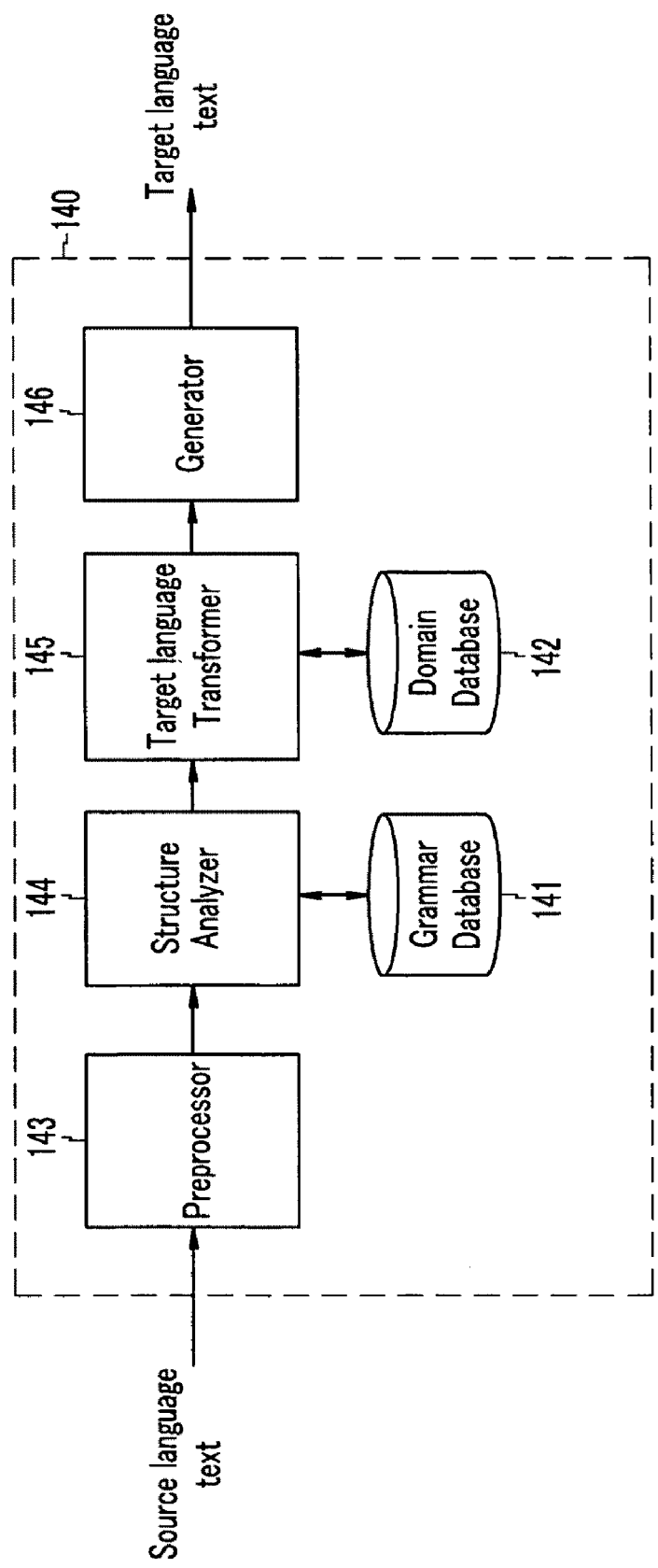
FIG. 4 is a translator according to an exemplary embodiment of the present invention.

FIG. 4 is a translator 140 according to an exemplary embodiment of the present invention.

Referring to FIG. 4, the translator 140 includes a grammar database (DB) 141, a domain DB 142, a preprocessor 143, a structure analyzer 144, a target language transformer 145, and a generator 146.

The grammar DB 141 stores source language analysis rules including a morpheme analysis dictionary corresponding to the source language, morpheme analysis knowledge, morpheme part of speech selection knowledge, a sentence division syntactic pattern, syntax grammar rule knowledge, and syntactic structure tree selection knowledge.

The domain DB 142 stores translation knowledge specified for the technical domain corresponding to the source language PDF file. For example, when the source language PDF file is a technical transaction, translation knowledge stored in the domain DB 142 can be generated by extracting technical terms and sentence pattern/transformation patterns from a plurality of transaction documents corresponding to the technical field to which the corresponding technical transaction belongs, and selecting analysis information, target language equivalent vocabulary, and pattern knowledge. Therefore, the translator 140 performs translation by using the translation knowledge and substantially reduces ambiguity of morpheme parts of speech, ambiguity of syntactic rules, ambiguity of selecting target language equivalents, and ambiguity of sentence pattern/transformation patterns, thereby allowing better translation.

The preprocessor 143 receives source language text divided from the tag of the source language XML/HTML file, and extracts sentences and words therefrom.

The structure analyzer 144 selects the optimized morpheme parts of speech corresponding to each word for the respective sentences extracted from the preprocessor 143 by using a morpheme analysis dictionary stored in the grammar DB 141, and generates a source language syntactic tree corresponding to the structure relationship of the corresponding source language sentence based on the morpheme parts of speech selected for each word.

The target language transformer 145 transforms the source language syntactic tree generated by the structure analyzer 144 into a target language syntactic tree based on the translation knowledge stored in the domain DB 142, and transforms the respective nodes of the source language syntactic tree, that is, source language vocabulary corresponding to each word, into target language vocabulary that meaningfully corresponds thereto.

The generator 146 generates and outputs a target language sentence based on the target language syntactic tree and target language vocabulary generated by the target language transformer 145.

Referring to FIG. 5 to FIG. 12, a machine translation method according to an exemplary embodiment of the present invention will now be described.

Figure 5:
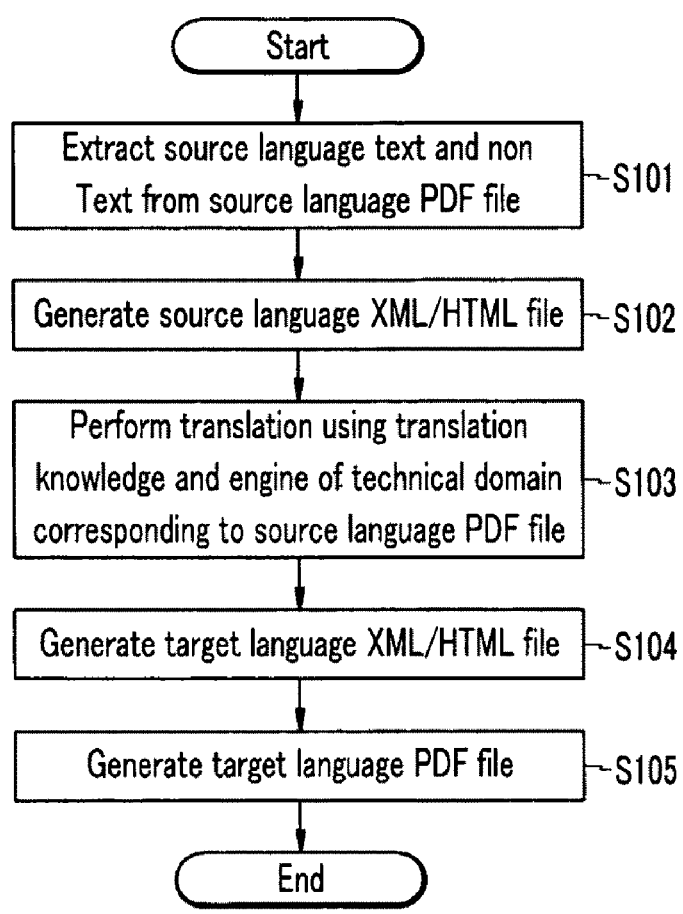
FIG. 5 is a flowchart for a machine translation method according to an exemplary embodiment of the present invention.

FIG. 5 is a flowchart for a machine translation method according to an exemplary embodiment of the present invention.

Referring to FIG. 5, when receiving a source language PDF file, the text extractor 110 extracts source language text, non-text, and text-related information (including text position information, and character font and size) from the source language PDF file (S101).

The paragraph restorer 120 combines and restores the contextually is divided source language text based on the text-related information, rearranges the restored source language text together with non-text according to the contextual flow of the source language PDF file, and thereby generates a source language XML/HTML file (S102).

The XML/HTML processor 130 divides source language text from the tag of the generated source language XML/HTML file and outputs the source language text, and the translator 140 translates corresponding source language text (S103). Here, the translator 140 uses translation knowledge and a translation engine specified for the technical field that corresponds to the source language PDF file that is input so as to translate the source language text.

The translated target language text is inserted into the tag of the XML/HTML file through the XML/HTML processor 130 other than the source language text (S104), and the PDF file transformer 150 transforms the corresponding target language XML/HTML file into a target language PDF file (S105).

A method for extracting source language text, non-text, and text-related information from the source language PDF file in the step of S101 will now be described referring to FIG. 6.

Figure 6:
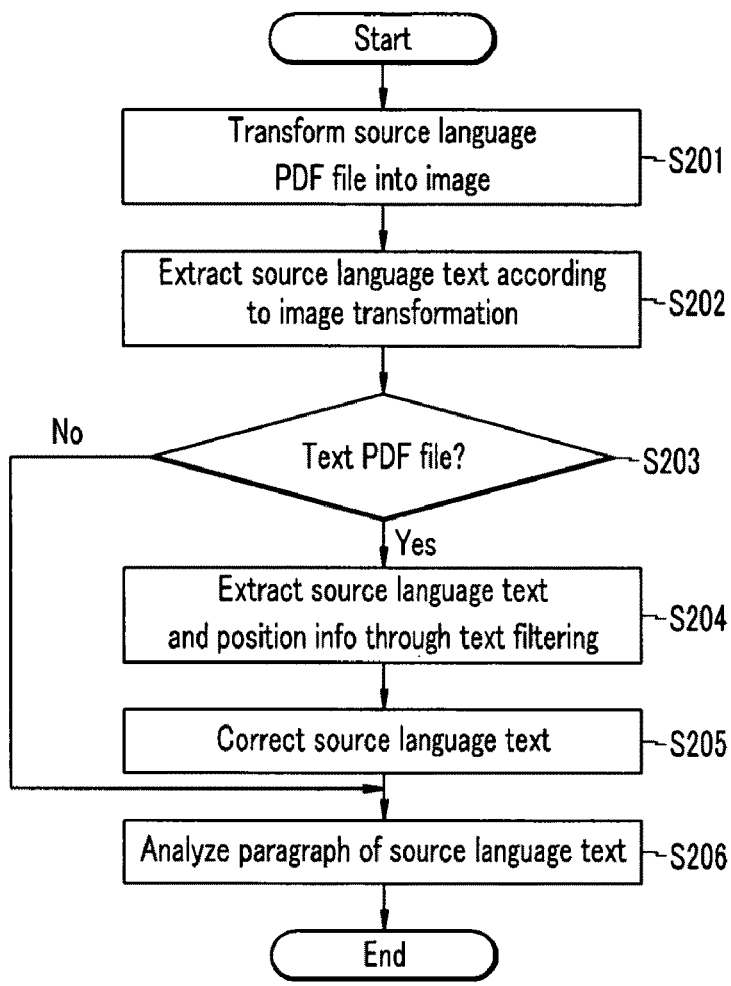
FIG. 6 is a flowchart of a method for extracting text, non-text, and text-related information from a source language PDF file according to an exemplary embodiment of the present invention.

FIG. 6 is a flowchart of a method for extracting text, non-text, and text-related information from a source language PDF file according to an exemplary embodiment of the present invention.

Referring to FIG. 6, the text extractor 110 transforms the source language PDF file into an image for each page by using print information of the source language PDF file (S201).

The text extractor 110 divides text that is a string including source language alphabets, figures, tables, and numerical formulas from the image of the source language PDF file, and extracts source language text and non-text therefrom. Also, the text extractor 110 generates text-related information by extracting the position, character font, and size of the recognized target (S202). Here, when the text extractor 110 extracts the non-text according to the character recognition method, the figure and the table are displayed at a predetermined region in the page. That is, the region of the figure is generated as an image file and is identified by position information of the figure region, and the table is extracted as a table configuration such as the XML or HTML format.

Further, the text extractor 110 classifies formula signs (e.g., +, −, /, and =) in the source language text, characters (e.g., number characters and Latin characters) other than the alphabets, and paragraphs in which the number of lower and higher subscripts is greater than or equal to 0.7 times the number of the whole characters in the paragraph and the last string is a numerical formula expression string such as "(1)" or "(2)" as numerical formulas, and classifies the region as non-text by storing the region as an image in a like manner of the figure. When the formula is classified as non-text, the drawback of inaccurately recognizing the characters given in the numerical formula in the case of identifying the numerical formula as a text string, and the problem of failure of translation or mistranslation when the inaccurately recognized string is combined with another text paragraph and is then translated, are prevented.

The text extractor 110 determines whether the source language PDF file is a text PDF file (S203), performs a text filtering process by using text information for each page of the source language PDF file in the case of the text PDF file, and extracts source language text caused by text information and position information of corresponding source language text (S204).

When the input source language PDF file is a text PDF file, the text extractor 110 compares the source language text extracted through image transformation and the source language text extracted through text filtering, and outputs corrected source language text (S205). That is, the text extractor 110 compares the orders and the absolute positions (in the page) of the source language text extracted through image transformation and the source language text extracted through text filtering, and corrects the same when finding different characters.

In this instance, the text extractor 110 selects the source language text that is extracted through image transformation in the case of character repetition that is the representative error of the PDF text filtering method, and selects the source language text that is extracted through text filtering in other cases, and then corrects the source language text. Here, the character repetition of the PDF text filtering method means that individual characters of a specific word "system" is repeatedly extracted as "ssyysstteemm", and this kind of error repeatedly extracts the same character as it mistakenly detects the position of a specific character and is frequently generated in a word that requires bold-type printing.

When the input source language PDF file is a text PDF file, the text extractor 110 uses the corrected source language text and corresponding text-related information to identify the source language text as a text paragraph for each page, classifies the text paragraph as a preface, a postface, a footnote, a body paragraph, a figure, and a table caption, structures position information of the text paragraph and text paragraph classification information including character font and size, and then outputs classified results (S206).

When the input source language PDF file has no text information, the correction steps S204 and S205 are omitted, and the structuring process is performed by using the source language text extracted through image transformation, non-text, and text-related information.

Next, a method for classifying the text paragraphs of the source language PDF file that is input in the step S206 will now be described referring to FIG. 7 and FIG. 8.

Figure 8:
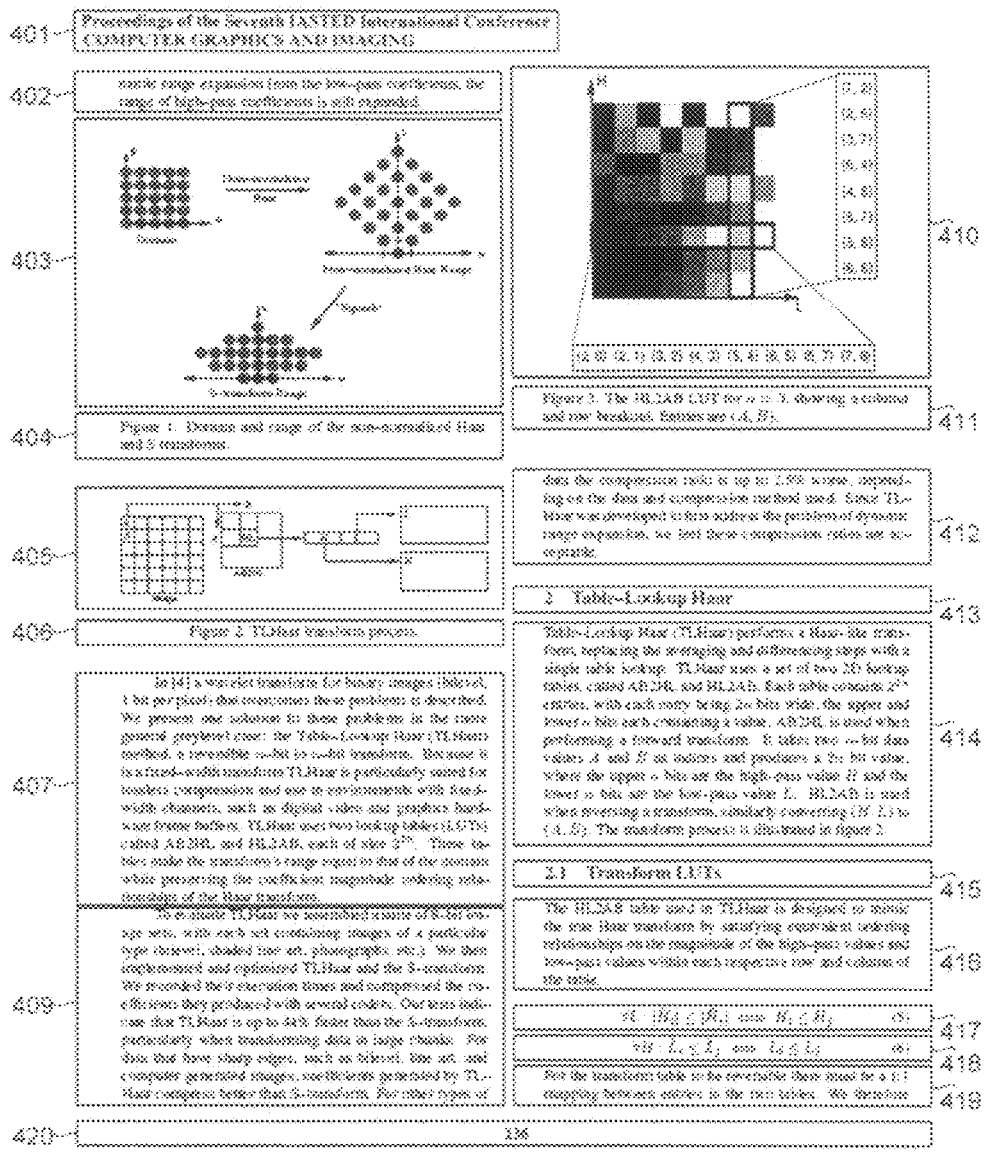
FIG. 8 is a case for classifying text paragraphs from the second page of a source language PDF file that is a scientific paper according to an exemplary embodiment of the present invention.

FIG. 7 and FIG. 8 are cases for classifying text paragraphs from the first and second pages of a source language PDF file that is a scientific paper, according to an exemplary embodiment of the present invention.

The text extractor 110 uses a string font, size, style, right and left spaces, and arrangement method on the document that are displayed on the respective lines on the corresponding pages of the source language PDF file so as to classify the source language text paragraphs according to categories. The text extractor 110 classifies the source language text paragraphs into a body paragraph and a non-body paragraph based on the above-noted information. Here, the non-body paragraph represents a preface, a postface, a footnote, and captions of figures and tables, and the body paragraph represents paragraphs of all text other than the non-body paragraph from among the source language text paragraphs including a paper title, a section title, a subsection title, and general paragraphs.

In order to classify the text paragraphs into the body paragraph and the non-body paragraph, the text extractor 110 groups the same types of lines to combine into a single text paragraph based on information including character font and size corresponding to each line of the source language PDF file, arrangement method, and top and bottom spaces. The text extractor 110 classifies the preface, postface, footnote, and captions from the grouped text paragraph, and classifies other text paragraphs into the body paragraph.

In order to extract the text paragraph that corresponds to the preface and the postface, the text extractor 110 extracts an upper text paragraph and a lower text paragraph deviating from the range of the page layout. That is, the upper text paragraph deviating from the page layout is a preface, and the lower text paragraph is a postface. Referring to FIG. 7 and FIG. 8 as examples, the prefaces are the 301 and 401 text paragraphs, and the postfaces are the 322 and 420 text paragraphs. Here, the page layout is variable by the types of the source language PDF file.

Also, the text extractor 110 is provided at the bottom in the page that is identified by a random line on the postface of each page, classifies the text paragraph having a string start character as a footnote, and referring to FIG. 7 and FIG. 8, the 314 text paragraph is the footnote.

Also, the text extractor 110 classifies the starting string for designating the figure and the table as a caption of the figure and the table by using the text paragraph above or below the figure and the table. When the source language is English for example, the captions of the figure and the table represent the text paragraphs starting with the strings such as "Figure.", "FIG.", "Table.", "Tbl.", and "Figure:". In FIG. 8, the figure captions are text paragraphs 404, 406, and 411.

In FIG. 7 and FIG. 8, the text paragraph 321 of FIG. 7 and the text paragraph 402 of FIG. 8 are contextually a single paragraph but are divided by the non-body paragraph, the text paragraph 321 of FIG. 7 is divided by the text paragraph 322, and the text paragraph 402 of FIG. 8 is divided by the text paragraph 401. Therefore, the last sentence "While this effectively eliminates dy-" is not finished as a complete sentence in the text paragraph 321, and the start sentence "namic range expansion is still expanded." is not a complete sentence in the text paragraph 402. Also, the text paragraphs 409 and 412 of FIG. 8 are contextually a single paragraph but are divided by the FIG. 410 and the figure caption 411, and the last sentence of the text paragraph 409 and the first sentence of the text paragraph 412 are not complete sentences. When the contextually one sentence is divided and extracted by the non-body paragraph, accurate analysis in the subsequent translation process is difficult and mistranslation occurs.

Next, a method for combining text in the step S102 of FIG. 5, rearranging the combined text together with non-text, and generating a source language XML/HTML file will now be described with reference to FIG. 7 to FIG. 9.

Figure 9:
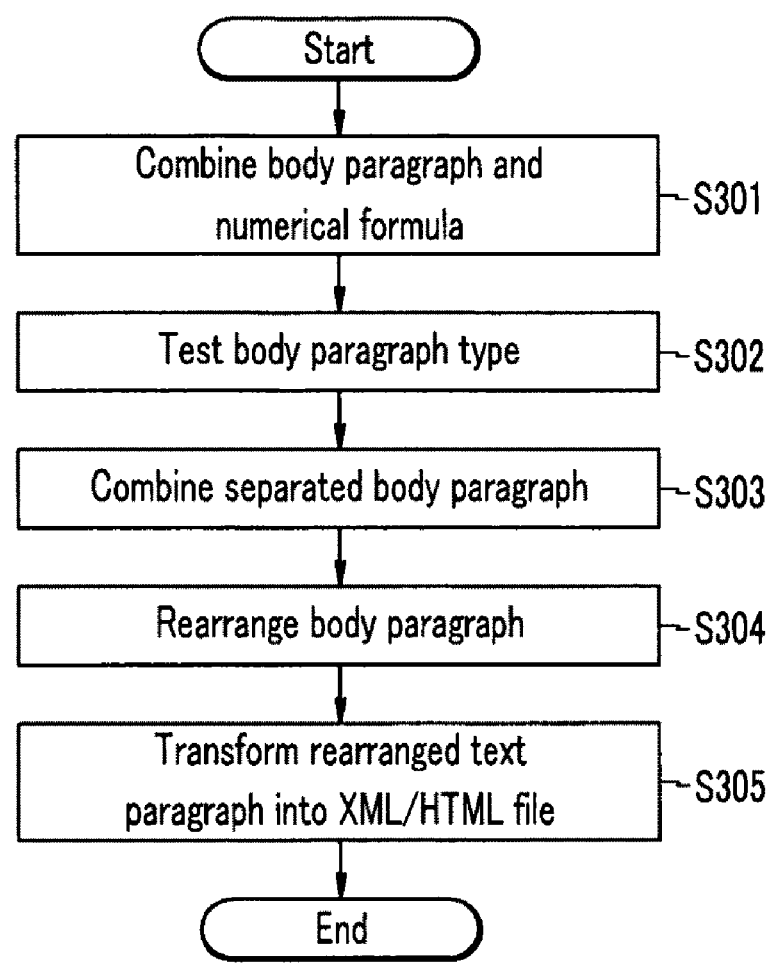
FIG. 9 is a flowchart for generating a source language XML/HTML file according to an exemplary embodiment of the present invention.

FIG. 9 is a flowchart for generating a source language XML/HTML file by combining and rearranging contextually separated text paragraphs according to an exemplary embodiment of the present invention.

Referring to FIG. 9, the paragraph restorer 120 connects the extracted numerical formula and the previous body paragraph to thus extend the body paragraph so that the body paragraph may include a numerical formula when the numerical formula is provided in the source language PDF file (S301). For example, the numerical formulas 312 and 313 of FIG. 7 are combined with the body paragraph 311. Also, the numerical formulas 316 and 317 of FIG. 7 are combined with the body paragraph 315, and the numerical formulas 417 and 418 of FIG. 8 are combined with the body paragraph 416.

The paragraph restorer 120 analyzes the body paragraphs to determine whether the body paragraphs are contextually complete paragraphs (S302). The process of the step S302 is not applied to the non-text including figures, numerical formulas, and tables, and the text paragraph excluding the body paragraph, and the non-text and the text paragraph are omitted from the order of connecting the text paragraphs. For example, the next paragraph of the body paragraph 311 combined with the numerical formulas 312 and 313 are the body paragraph 315 combined with the numerical formulas 316 and 317 other than the footnote 314.

In order to determine whether the body paragraph is contextually complete, the paragraph restorer 120 uses font information including character font, font size, and font style of the body paragraph, and paragraph information including text arrangement method and top/bottom/right/left spaces. That is, when one of the character font, size, style, and text arrangement of the previous body paragraph and the next body paragraph is different, the paragraph restorer 120 determines that the corresponding body paragraph is contextually complete. For example, the paragraph restorer 120 determines that the corresponding body paragraph is contextually complete since the character font and size of the body paragraph 302 of FIG. 7 are different from those of the bottom body paragraph 303, and the character font, size, style, and arrangement of the body paragraph 306 are different from those of the previous body paragraph 304. Also, the body paragraphs 302, 303, 304, 306, 307, 308, 309, and 310 of FIG. 7 and the body paragraphs 413 and 415 of FIG. 8 can be determined to be contextually complete.

Regarding the body paragraph that does not satisfy the above-described condition, the paragraph restorer 120 detects the start and end information of the respective body paragraphs through a paragraph test, and determines whether it is a divided body paragraph.

The reference condition for determining the paragraph start and the paragraph end by the paragraph restorer 120 is as follows.

<paragraph start>

Start A: a paragraph in which the first word starts with a capital alphabet.

Start B: a paragraph in which the first word is an itemized symbol.

Start C: all paragraphs other than Start A and Start B.

<paragraph end>

End A: a paragraph in which the last word ends with a period ".", colon ":", question mark "?", exclamation mark "!", left quotation mark """, or left parentheses ")" or "]".

End B: a paragraph in which the last part ends with a numerical formula.

End C: all paragraphs other than End A and End B.

For example, in FIG. 7, the body paragraph 311 combined with the numerical formulas 312 and 313 has <Start A, End B>, the body paragraph 315 combined with the numerical formulas 316 and 317 has <Start C, End B>, the body paragraph 318 has <Start C, End A>, the body paragraph 319 has <Start A, End A>, the body paragraph 320 has <Start A, End A>, and the body paragraph 321 has <Start A, End C>. Also, in FIG. 8, the body paragraph 402 can be expressed as <Start C, End A>, the body paragraph 407 is given as <Start A, End A>, the body paragraph 409 is expressed as <Start A, End C>, the body paragraph 413 is expressed as <Start C, End A>, the body paragraph 414 is expressed as <Start A, End A>, the body paragraph 416 combined with the numerical formulas 417 and 418 is expressed as <Start A, End B>, and the body paragraph 419 is expressed as <Start A, End C>.

As described above, when the start and end information of the respective body paragraphs is determined, the paragraph restorer 120 uses the information to estimate the divided body paragraph. That is, the body paragraph that is not expressed as <Start A, End A> and <Start B, End A> according to the paragraph test result becomes a candidate of the divided paragraph.

Referring to FIG. 9, when it is determined that the body paragraph is not contextually complete, the paragraph restorer 120 combines the corresponding body paragraph according to the next reference (303).

First, the body paragraph with Start C is unconditionally combined with the previous body paragraph. The body paragraph other than <Start B, End C> is combined with the next body paragraph when the body paragraph is not Start B. For example, in FIG. 7, the combination paragraphs <311, 312, 313> are combined with the combination paragraphs <315, 316, 317> and are then combined with the body paragraph 318 to generate new combination paragraphs <311, 312, 313, 315, 317, 318>. Also, the body paragraph 321 and the body paragraph 402 of FIG. 7 and FIG. 8 are combined to generate a new combination paragraph <321, 402>, and the body paragraph 409 and the body paragraph 412 of FIG. 8 are combined to generate a new combination paragraph <409, 412>.

When the divided body paragraphs are combined as described above, the paragraph restorer 120 rearranges the text paragraph (including the combination paragraph) except the preface, postface, and footnote, and the non-text according to the position information based on the contextual order of the source language PDF file (S304).

In this instance, in the case of combination paragraphs, their positions are determined during rearrangement according to the start position of the first paragraph in the combination paragraphs. For example, the order of the body paragraphs of FIG. 7 and FIG. 8 is 302, 303, 304, 305, 306, 307, 308, 309, 310, <311, 312, 313, 315, 316, 317, 318>, 319, 320, <321, 402>, 403, 404, 405, 406, 407, <409, 412>, 410, 411, 413, 414, 415, <416, 417, 418>, 419. In this instance, differing from the input source language PDF file, the FIG. 410 and the caption 411 provided between the combination paragraph <409, 412> of FIG. 8 are moved behind the combination paragraph <409, 412> because the body paragraph 409 that is the first paragraph is provided before the FIG. 410 and the caption 411.

The positions of the preface and the postface are determined according to the document layout, and the footnote is moved to the last part so that there may be no influence when the page is changed after the source language is translated into the target language.

Referring to FIG. 9, when rearrangement of the text and non-text is finished, the paragraph restorer 120 expresses the arranged text paragraphs as XML/HTML tags together with the character font and size corresponding to each text paragraph, style, arrangement, and relative distance information of the previous text paragraph, and transforms the same into a source language XML/HTML file so that it may be similar to the source language PDF file to which a layout is input (S305).

Next, a method for translating the source language XML/HTML file, and generating a target language XML/HTML file and target language PDF file in the steps S103 to S105 of FIG. 5, will now be described referring to FIG. 10.

Figure 10:
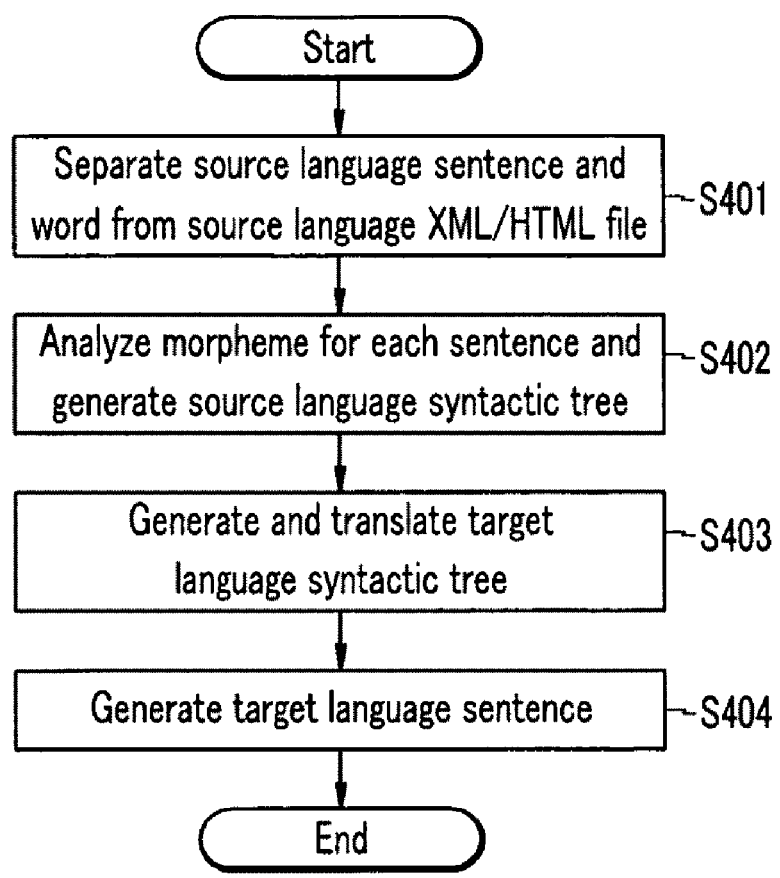
FIG. 10 is a flowchart for a translation process according to an exemplary embodiment of the present invention.

FIG. 10 is a flowchart for a translation process according to an exemplary embodiment of the present invention.

Referring to FIG. 10, the XML/HTML processor 130 divides source language text from tag information of the source language XML/HTML file, and outputs the source language text to the translator 140.

The translator 140 separates a sentence and a word token from the input source language text (S401), and classifies the separated token into a symbol, numerical formula, and word. Also, when the sentence that is separated from the source language text is separated by a colon ":" and the sentence is incomplete, the sentence is completely restored. Referring to FIG. 7 as an example, the last sentence "The Haar transformation is defined by:" of the text paragraph 311 is restored as the sentence "The Haar transformation is defined by the equations:" since the target language of the preposition "by" is omitted and the target language is a numerical formula of the next sentence.

The translator 140 generates a source language syntactic tree through morpheme analysis for each sentence (S402). For this purpose, the translator 140 analyzes the morpheme by using a morpheme analysis dictionary and morpheme analysis knowledge for each sentence, and performs a tagging process for finding the part of speech that is contextually the most suitable for the input sentence from among the parts of speech that are allocated to the morpheme. In the exemplary embodiment of the present invention, the morpheme part of speech tagging process can be performed by using a lexicalized n-gram tagging probability model. The translator 140 also evaluates problems of unknown words, errors of spelling, and errors of word spacing while performing morpheme analysis.

When the morpheme analysis is finished, the translator 140 parses the syntactic structure of the input sentence and generates a source language syntactic tree by using the sentence pattern and the syntactic rule of the source language based on the morpheme part of speech tagging result. The translator 140 solves the ambiguity by using the probability and knowledge-based module of each problem when a problem such as parallel construction or prepositional phase attachment occurs. Also, when the sentence is long or has a parsing structure having a length that is greater than a predetermined length, the sentence is divided according to a sentence division syntax pattern, the syntactic structure is parsed for each divided simple sentence, and corresponding results are combined to thus parse the long syntactic structure and generate a source language syntactic tree.

When the source language syntactic tree is generated, the translator 140 generates a target language syntactic tree to satisfy the context of the target language to be translated, and transforms the source language vocabulary that corresponds to each node (word) of the source language syntactic tree into meaningfully corresponding target language vocabulary (S403).

For this purpose, the translator 140 performs a structure transformation process on the source language syntactic tree by using a transformation pattern of the technical field that corresponds to the input source language PDF file, and thereby generates a target language syntactic tree. The structure transformation is performed for each sentence, paragraph, and phrase, and a transformation pattern that is the most optimally matched with the technical field corresponding to the input source language PDF file is selected for the transformation pattern used in this case. When the source language syntactic tree is transformed into the target language syntactic tree, the translator 140 translates the source language vocabulary into target language vocabulary by using a translation dictionary. In this process, the translator 140 solves the ambiguity (i.e., the ambiguity of selecting target language vocabulary for the source language vocabulary having multiple meanings) on target language word selection that may occur during the vocabulary transformation process by using a translation dictionary that is specific to the technical field that corresponds to the input source language PDF file.

When the target language syntactic tree is generated, the translator 140 arranges the transformed target language vocabulary based on the target language syntactic tree according to the order of target language words, and generates and outputs the target language sentence (S404).

When the sentences of the source language XML/HTML file are translated into the corresponding target language sentences, the XML/HTML processor 130 includes the target language sentence that is generated by translating the corresponding source language sentence other than the source language sentence into the tag information to generate a target language XML/HTML file. Finally, the generated target language XML/HTML file is transformed into the target language PDF file by the PDF file transformer 150, and is then provided.

As described, in the exemplary embodiment of the present invention, text correction for translation is performed by using the results of the text extraction through image transformation and the text extraction through text filtering in the text extraction process, and hence errors that may occur during the text extraction process are reduced.

Also, when the text is extracted and the sentence is configured for translation, in order to prevent the case in which translation is difficult since the sentence is separated by a figure, table, numerical formula, footnote, preface, or postface, the complete sentence is generated by combining the separated paragraphs through paragraph analysis to thus prevent no performance of translation because of an incomplete sentence.

When the translation is performed by using translation knowledge and a transformation pattern specified for the technical field that corresponds to the source language PDF file to be translated, more accurate translation is allowable since ambiguity of morpheme parts of speech, ambiguity of syntactic rules, ambiguity of selecting target language words, and ambiguity of sentence pattern/transformation patterns are reduced during translation.

The PDF file has been exemplified as the file format of the source language in the exemplary embodiment of the present invention, and other types of electronic document files having no markup tags in a like manner of the PDF file and including output information other than the PDF file are applicable to the present invention. Further, the XML/HTML file has been exemplified for translation in the exemplary embodiment of the present invention, and other types of markup language files other than the XML/HTML file are usable.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A machine translating method for a source language PDF file in a machine translation device, the method comprising:
   extracting, by the machine translation device, source language text from the source language PDF file;
   analyzing, by the machine translation device, the source language text to classify the source language text into text paragraphs;
   classifying, by the machine translation device, the text paragraphs into body paragraphs and non-body paragraphs;
   selecting, by the machine translation device, a first body paragraph that is not contextually divided among the body paragraphs based on at least one of font information and paragraph information;
   testing, by the machine translation device, a paragraph of a second body paragraph other than the first body paragraph among the body paragraphs to extract start and end information of the paragraph;
   selecting, by the machine translation device, a contextually divided body paragraph based on the start and end information;
   restoring, by the machine translation device, the source language text by combining a contextually divided body paragraph in the source language text; and
   translating, by the machine translation device, the restored source language text into target language text.

2. The method of claim 1, wherein
the step of extracting includes:
   transforming the source language PDF file into an image;
   extracting first source language text from the source language PDF file image;
   extracting second source language text from the source language PDF file when the source language PDF file is an electronic document text file; and
   outputting the source language text by correcting an error through comparison of the first source language text and the second source language text when the source language PDF file is an electronic document text file.

3. The method of claim 2, wherein
the step of outputting includes:
   selecting the first source language text as the source language text when the error is a character repetition error; and
   selecting the second source language text as the source language text when the error is not a character repetition error.

4. The method of claim 1, wherein
the step of selecting the first body paragraph includes:
   combining a numerical formula and the body paragraph that is provided before the numerical formula from the body paragraphs when the numerical formula is provided in the source language PDF file; and
   determining whether all body paragraphs including the body paragraph combined with the numerical formula are contextually divided.

5. The method of claim 1, wherein
the step of classifying the text paragraphs includes
classifying a text paragraph corresponding to a preface, a postface, a footnote, or a caption from among the at least one text paragraph into the at least one non-body paragraph, and
the step of classifying the text paragraph into at least one non-body paragraph includes:
   determining an upper text paragraph that digresses from the page layout of the source language PDF file as the preface;
   determining a lower text paragraph that digresses from the page layout of the source language PDF file as the postface;
   determining a text paragraph that is identified by a random line over the postface, which is provided at the bottom of the page, and in which a string start character is a subscript, to be the footnote; and
   determining a text paragraph that is provided below or above a figure or a table and that starts with a string for designating the figure or the table to be the caption.

6. The method of claim 1, wherein
the step of translating includes:
   classifying the source language text into at least one sentence and at least one word included in the at least one sentence;
   generating a source language syntactic tree through a morpheme analysis for the at least one sentence;
   transforming the source language syntactic tree into a target language syntactic tree by using translation knowledge and transformation patterns corresponding to the technical field that corresponds to the source language PDF file;
   transforming the source language vocabulary included in the at least one sentence into target language vocabulary; and
   generating the target language text by arranging the target language vocabulary based on the target language syntactic tree.

7. The method of claim 1, further comprising:
   generating a source language markup language file by rearranging the restored source language text; and
   inserting the target language text other than the restored source language text into the source language markup language file to generate a target language markup language file.

8. A non-transitory recording medium for recording a program for performing the method disclosed in claim 1.

9. A method for mechanically translating a source language PDF file in a machine translation device, the method comprising:
   transforming, by the machine translation device, the source language PDF file into an image;
   extracting, by the machine translation device, first source language text from the resulting image;
   extracting, by the machine translation device, second source language text from text information of the source language PDF file when the source language PDF file is an electronic document text file;

comparing, by the machine translation device, the first source language text and the second source language text and correcting the first source language text when the source language PDF file is an electronic document text file; and translating, by the machine translation device, the first source language text into target language text, wherein the step of correcting includes correcting a character of the first source language text with a character of the second source language text when another character is generated according to the result of comparison between the first source language text and the second source language text and there is no repetition error at the character of the second source language text.

10. The method of claim 9, wherein the step of translating includes:

restoring the first source language text by combining a paragraph that is separated by at least one of non-text, postface, preface, footnote, and caption from the first source language text; and transforming the first source language text into the target language text by using translation knowledge and transformation patterns specified for the technical field that corresponds to the source language PDF file.

11. A method for mechanically translating a source language PDF file in a machine translation device, the method comprising:

extracting, by the machine translation device, source language text and non-text from the source language PDF file;

restoring, by the machine translation device, the source language text by combining a contextually separated paragraph from among the source language text;

generating, by the machine translation device, a source language markup language file by rearranging the restored source language text and the non-text based on the contextual flow of the source language PDF file; and generating, by the machine translation device, a target language markup language file by translating the restored source language text into target language text, wherein the step of extracting comprises:

extracting the source language text from the source language PDF file through image transformation; and when the source language electronic document file is an electronic document text file, comparing the source language text and the text that is extracted from text information included in the source language PDF file, and correcting the source language text when an error occurs except a character repetition error of the text that is extracted from the text information.

12. The method of claim 11, wherein the step of restoring includes:

analyzing the source language text, and classifying it into at least one text paragraph;

classifying the at least one text paragraph into at least one body paragraph and at least one non-body paragraph;

combining the body paragraph separated by the non-text from among the at least one body paragraph and at least one of the at least one non-body paragraph; and restoring the source language text by rearranging the combined body paragraph.

13. The method of claim 11, wherein the step of translating into the target language text includes:

transforming the source language text into a target language syntactic tree by using a transformation pattern specified for the technical field that corresponds to the source language PDF file;

transforming vocabulary of the source language text into target language vocabulary by using a translation dictionary specified for the technical field that corresponds to the source language PDF file; and generating the target language text by arranging the target language vocabulary based on the target language syntactic tree.

* * * * *